(12) United States Patent
Koyano

(10) Patent No.: US 10,122,922 B2
(45) Date of Patent: Nov. 6, 2018

(54) IMAGE PICKUP APPARATUS AND IMAGE STABILIZATION METHOD

(71) Applicant: OLYMPUS CORPORATION, Hachioji-shi, Tokyo (JP)

(72) Inventor: Kento Koyano, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/408,933

(22) Filed: Jan. 18, 2017

(65) Prior Publication Data

US 2017/0214853 A1 Jul. 27, 2017

(30) Foreign Application Priority Data

Jan. 21, 2016 (JP) ................... 2016-009897

(51) Int. Cl.
*H04N 5/228* (2006.01)
*H04N 5/232* (2006.01)
*G02B 27/64* (2006.01)

(52) U.S. Cl.
CPC ....... *H04N 5/23267* (2013.01); *G02B 27/646* (2013.01); *H04N 5/23254* (2013.01); *H04N 5/23258* (2013.01); *H04N 5/23287* (2013.01)

(58) Field of Classification Search
CPC ........... H04N 5/23248; H04N 5/23251; H04N 5/23258; H04N 5/23264; H04N 5/23267; H04N 5/2327; H04N 5/2328; H04N 5/144; H04N 5/145; G03B 2217/005; G03B 2205/0007; G03B 2205/0023; G02B 27/64; G02B 27/644
See application file for complete search history.

(56) References Cited

U.S. PATENT DOCUMENTS

| | | | | |
|---|---|---|---|---|
| 9,185,297 | B2* | 11/2015 | Yamazaki | H04N 5/23254 |
| 2009/0316010 | A1* | 12/2009 | Nomura | G03B 5/00 |
| | | | | 348/208.6 |
| 2010/0150537 | A1* | 6/2010 | Tsuchihashi | G02B 27/646 |
| | | | | 396/55 |
| 2014/0049658 | A1* | 2/2014 | Yamazaki | H04N 5/23254 |
| | | | | 348/208.11 |

(Continued)

FOREIGN PATENT DOCUMENTS

JP 2014-206660 A 10/2014

*Primary Examiner* — Kelly L Jerabek
(74) *Attorney, Agent, or Firm* — Volpe and Koenig, P.C.

(57) ABSTRACT

An image pickup apparatus includes: an angular velocity sensor configured to detect image blur in translation and rotation directions; an image stabilization microcomputer; an image pickup device drive actuator configured to cause the image pickup device to move to perform optical correction of image blur in the translation direction and, when necessary, image blur in the rotation direction; a system controller configured to perform electronic correction of cutting out a part of image; and a walking detecting portion configured to detect which of a walking state and a non-walking state of the image pickup apparatus, wherein in a case of the walking state, an amount of correction of the image blur in the rotation direction is caused to be smaller by the optical correction, and is caused to be larger by the electronic correction, compared with the non-walking state.

8 Claims, 14 Drawing Sheets

(56) References Cited

U.S. PATENT DOCUMENTS

| | | | |
|---|---|---|---|
| 2014/0111658 A1* | 4/2014 | Watanabe | H04N 5/23267 348/208.1 |
| 2014/0111659 A1* | 4/2014 | Miyasako | H04N 5/23258 348/208.1 |
| 2014/0186017 A1* | 7/2014 | Shibata | H04N 5/23248 396/55 |
| 2015/0264266 A1* | 9/2015 | Katsuyama | G02B 27/646 348/208.2 |
| 2016/0182828 A1* | 6/2016 | Ikeda | H04N 5/23245 348/208.5 |

* cited by examiner

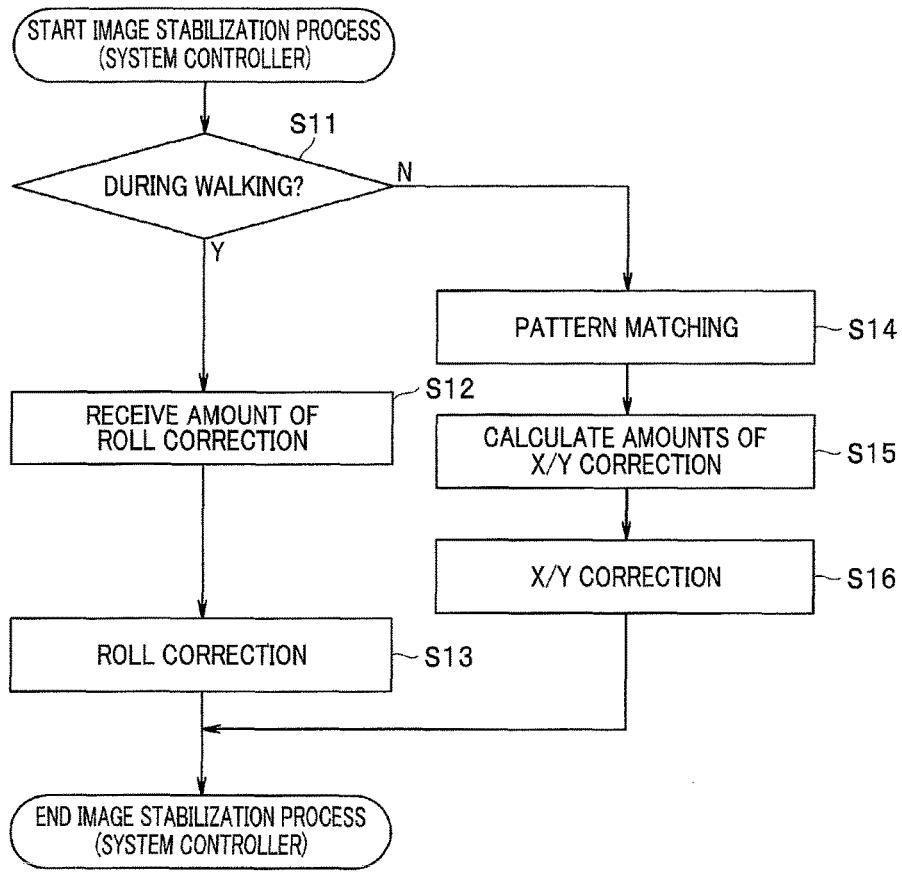

IMAGE PICKUP APPARATUS AND IMAGE STABILIZATION METHOD

CROSS REFERENCE TO RELATED APPLICATION

This application claims benefit of Japanese Application No. 2016-009897 filed in Japan on Jan. 21, 2016, the entire contents of which are incorporated herein by this reference.

BACKGROUND OF THE INVENTION

1. Field of the Invention

The present invention relates to an image pickup apparatus which detects and corrects amounts of image blur of an object image in a translation direction and a rotation direction, and an image stabilization method.

2. Description of the Related Art

Recently, cameras equipped with an image stabilization function have been common, and it has become possible to obtain a photographed image without image blur without especially paying attention in hand-held photographing.

Further, there are lens interchangeable cameras in which a taking lens is changeable according to photographing purposes. There are mainly two types of such a camera: a type in which an interchangeable lens is equipped with the image stabilization function described above and a type in which a camera body is equipped with the image stabilization function (however, both of the interchangeable lens and the camera body may be equipped with the function).

In the case where the interchangeable lens is equipped with the image stabilization function, a sensor configured to detect a motion applied to the interchangeable lens (and, therefore, the camera body integrally coupled with the interchangeable lens) is provided in the interchangeable lens, and image blur is corrected by moving a part of a taking lens group on a plane orthogonal to an optical axis in such a direction that offsets image blur caused by the detected motion.

On the other hand, in the case where the camera body is equipped with the image stabilization function, a sensor configured to detect a motion applied to the camera body is provided in the camera body, and image blur is corrected by moving an image pickup device in such a direction that offsets image blur caused by the detected motion.

Further, a movie is acquired in various methods such as hand-held still photographing, panning photographing, walking photographing and photographing from a transportation vehicle such as an automobile and a train. Since characteristics of blur caused in a movie differ according to which method photographing has been performed, a correction range and a processing method optimal for image stabilization differ.

For example, since a blur angle in walking photographing is larger than in still photographing, a correction range optimal for hand-held still photographing is an insufficient range in walking photographing, and it becomes difficult to acquire a movie with little blur.

As a technique paying attention to such a point, for example, Japanese Patent Application Laid-Open Publication No. 2014-206660 describes a technique in which, as an example of control of a camera including a lens capable of image stabilization, whether the camera is in a walking state or not is judged based on a rotational blur detected by an angular velocity sensor and a translational blur detected by an acceleration sensor, and a range of image stabilization by a lens is caused to be wider at the time in a walking state than at the time in a non-walking state.

SUMMARY OF THE INVENTION

An image pickup apparatus according to a certain aspect of the present invention includes: a photographing optical system configured to form an optical object image; an image pickup device configured to photoelectrically convert the object image to generate an image pickup signal; an image blur detection sensor configured to detect amounts of image blur of the object image in a translation direction and a rotation direction on an image plane of the image pickup device; an optical correction actuator configured to cause the image pickup device to move in a plane vertical to an optical axis of the photographing optical system to perform optical correction of image blur in the translation direction and, when necessary, further perform optical correction of image blur in the rotation direction; an electronic correction portion configured to cut out a part of image data obtained based on the image pickup signal and cause the part to be an output image; and a walking detecting portion configured to detect which state the image pickup apparatus is in, a walking state or a non-walking state. If the walking detecting portion detects that the image pickup apparatus is in the walking state, an amount of correction of the image blur in the rotation direction by the optical correction actuator is caused to be smaller, and an amount of correction of the image blur in the rotation direction by the electronic correction portion is caused to be larger than a case where the walking detecting portion detects that the image pickup apparatus is in the non-walking state.

An image stabilization method according to a certain aspect of the present invention includes the steps of: photoelectrically converting an optical object image by an image pickup device to generate an image pickup signal; detecting amounts of image blur of the object image in a translation direction and a rotation direction on an image plane of the image pickup device; causing the image pickup device to move in a plane vertical to an optical axis of a photographing optical system to perform optical correction of image blur in the translation direction and, when necessary, further perform optical correction of image blur in the rotation direction; performing electronic correction to cut out a part of image data obtained based on the image pickup signal and cause the part to be an output image; and detecting which of a walking state and a non-walking state the image pickup apparatus is in. If it is detected by the detection that the image pickup apparatus is in the walking state, an amount of correction of the image blur in the rotation direction by performing the optical correction is caused to be smaller, and an amount of correction of the image blur in the rotation direction by performing the electronic correction is caused to be larger than a case where it is detected by the detection that the image pickup apparatus is in the non-walking state.

BRIEF DESCRIPTION OF THE DRAWINGS

FIG. 11 is a flowchart showing a process of the system controller in the image stabilization of the image pickup apparatus of the first embodiment;

FIG. 12 is a table showing proper use of electronic correction and optical correction depending on whether a walking state or not, and obtained effects in the first embodiment;

DETAILED DESCRIPTION OF THE PREFERRED EMBODIMENTS

Embodiments of the present invention will be described with reference to drawings.

First Embodiment

Figure 1:
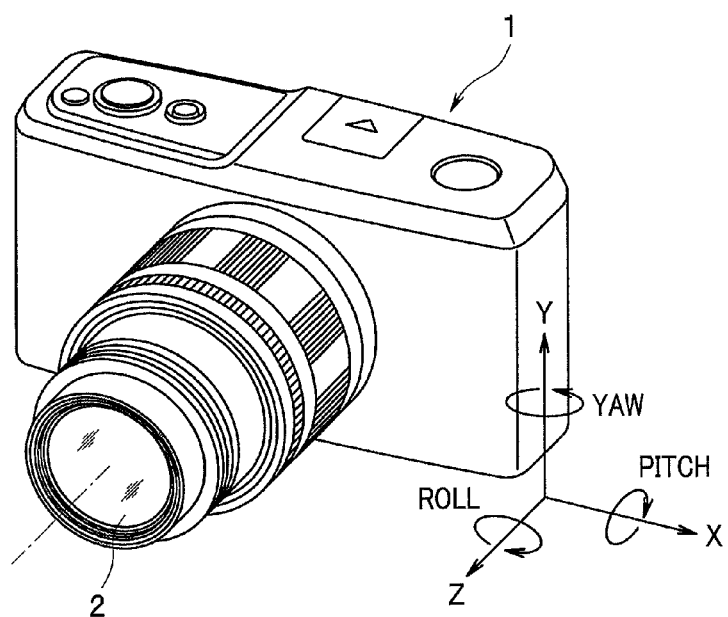
FIG. 1 is a perspective view for illustrating definitions of directions of rotational motions of an image pickup apparatus of a first embodiment of the present invention.

FIGS. 1 to 13 show a first embodiment of the present invention. FIG. 1 is a perspective view for illustrating definitions of directions of a rotational motion of an image pickup apparatus. In the present embodiment, the image pickup apparatus is applied to a camera as seen from an external appearance shown in FIG. 1, and, therefore, the image pickup apparatus will be referred to as a camera.

With reference to FIG. 1, coordinates will be defined for the image pickup apparatus first, and, then, directions of rotational motions will be furthermore defined.

The camera is provided with a camera body 1 and an interchangeable lens 2. An up-and-down direction (a direction along gravity) when such a camera is in a standard photographing attitude is assumed to be a Y direction, and, for convenience, an upward direction is indicated by a + direction of Y (therefore, a − direction of Y indicates a downward direction).

Furthermore, a left-and-right direction of the camera is assumed to be an X direction, and a right direction when the camera is seen from a front is indicated by a + direction of X (therefore, a − direction of X indicates a left direction).

An optical axis direction of the interchangeable lens 2 of the camera is assumed to be a Z direction, and an object-side direction is assumed to be a + direction of Z (therefore, a − direction of Z is an image-side direction).

In such definitions of coordinate axes, it is assumed that an XY plane is parallel to an image plane of an image pickup device 12 (see FIG. 2) to be described later (that is, the image plane of the image pickup device 12 is vertical in the Z direction which is the optical axis direction).

Next, a rotational motion around a Y axis, which is an axis in the Y direction, relative to the camera is assumed to be a rotational movement in a yaw direction, a rotational motion around an X axis, which is an axis in the X direction, is assumed to be a rotational movement in a pitch direction, and a rotational motion around a Z axis, which is an axis in the Z direction, is assumed to be a rotational movement in a roll direction; and it is assumed that a direction of each arrow shown in FIG. 1 is a + direction of each rotational motion (therefore, a − direction of each rotational motion is an opposite direction of each arrow).

However, each axis direction, and positive and negative of the rotation direction around each axis depend on directions of an acceleration sensor and an angular velocity sensor (to be described later) implemented in the camera, and, therefore, are not limited to the above.

Figure 2:
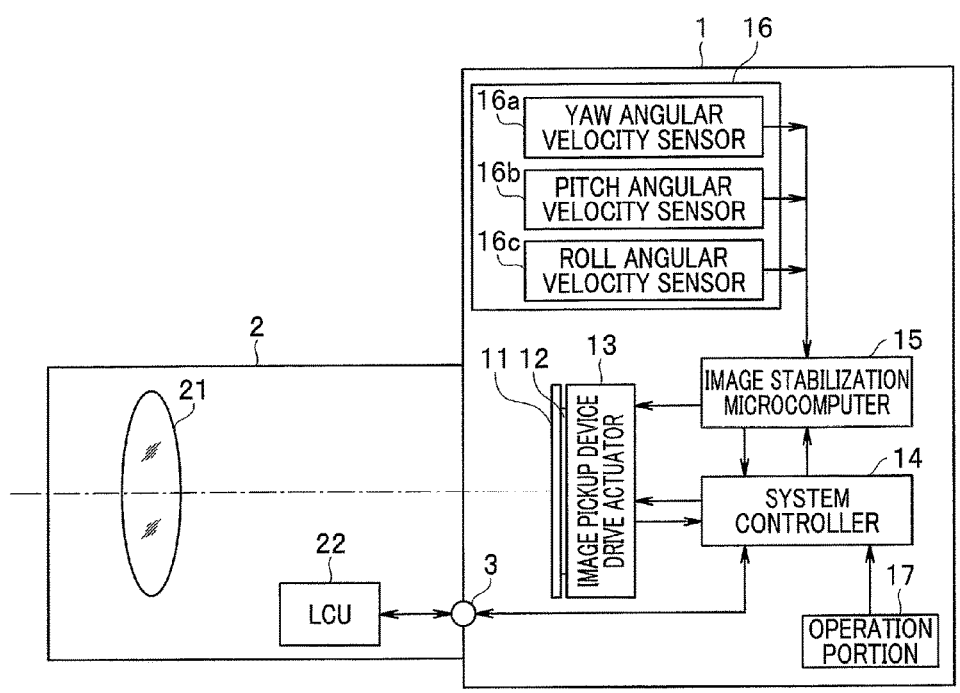
FIG. 2 is a block diagram showing a configuration of the image pickup apparatus of the first embodiment.

Next, FIG. 2 is a block diagram showing a configuration of the image pickup apparatus.

The camera, which is an image pickup apparatus, is configured such that the camera body 1 and the interchangeable lens 2 are detachably connected, for example, via a lens mount 3 as shown in FIG. 2.

The camera body 1 includes a focal-plane shutter 11, the image pickup device 12, an image pickup device drive actuator 13, a system controller 14, an image stabilization microcomputer 15, an angular velocity sensor 16 and an operation portion 17.

The interchangeable lens 2 includes a photographing optical system 21 and a lens control unit (LCU) 22.

One part of the lens mount 3 is provided on the camera body 1, and the other part is provided on the interchangeable lens 2. By coupling the one part and the other part each other, the interchangeable lens 2 is integrally fixed to the camera body 1. Furthermore, the lens mount 3 is provided with an electrical terminal, and the camera body 1 and the interchangeable lens 2 can electrically communicate with each other through the electrical terminal.

Note that, though a single-lens reflex type camera in which the camera body 1 and the interchangeable lens 2 can be attachable to and detachable from each other is given an example here, a compact type camera in which a camera body is integrated with a lens, and the like are also possible.

Next, a more detailed configuration and operation of each portion of the camera body 1 and the interchangeable lens 2 described above will be described.

First, the operation of each portion of the interchangeable lens 2 is as shown below.

The photographing optical system 21 is configured including a lens and an aperture, and forms an image of a light flux from an object on the image plane provided on a surface of the image pickup device 12 as an optical object image. At this time, when the camera shakes, the object image formed on the image pickup device 12 is blurred. The blur is detected based on an output of the angular velocity sensor 16 as described later and is optically corrected by the image pickup device drive actuator 13 based on control of the image stabilization microcomputer 15 or electronically corrected by the system controller 14.

The LCU 22 communicates with the camera body 1 via the lens mount 3. For example, the LCU 22 is provided with a storage portion configured to nonvolatilely store various pieces of information about the interchangeable lens 2 (for example, a model number and a manufacture number of the interchangeable lens 2, optical characteristics of the photographing optical system 21 and the like), and notifies the camera body 1 of the information when necessary. Further, the LCU 22 also performs focus control and aperture control for the photographing optical system 21, but description of details will be omitted.

Next, a more detailed configuration and operation of each portion of the camera body 1 will be described.

The focal-plane shutter 11 is arranged in front of the image pickup device 12 and on an optical path of an optical object image formed by the photographing optical system 21, and controls a time period during which a light flux passes through by performing an opening/closing operation of a shutter curtain and thus controls an exposure time period of the image pickup device 12.

Therefore, when the focal-plane shutter 11 is in an open state, an optical object image is incident on the image plane of the image pickup device 12 and formed, and the image pickup device 12 is in an exposure state.

The image pickup device 12 photoelectrically converts the formed optical object image on the image plane to generate an image pickup signal. The image pickup signal generated by the image pickup device 12 is read in response to a control signal from the system controller 14 and inputted to the system controller 14.

The image pickup device drive actuator 13 is an optical correction actuator configured to cause the image pickup device 12 to move in a plane vertical to the optical axis of the photographing optical system 21 to perform optical correction of image blur in a translation direction and, when necessary, further perform optical correction of image blur in a rotation direction.

That is, the image pickup device drive actuator 13 drives the image pickup device 12 in the X direction, the Y direction and the roll direction (in a θ direction in FIG. 7) in the plane parallel to the image plane, based on a drive instruction from the image stabilization microcomputer 15. Here, since the image pickup device 12 moves in the X direction because of blur in the yaw direction, driving of the image pickup device 12 in the X direction is performed in order to cope with the blur in the yaw direction. Similarly, since the image pickup device 12 moves in the Y direction because of blur in the pitch direction, driving of the image pickup device 12 in the Y direction is performed in order to cope with the blur in the pitch direction.

Thus, in the present embodiment, by providing the camera body 1 with the image pickup device drive actuator 13 having an image stabilization function, it is possible to correct blur in the roll direction which cannot be corrected in a case where the interchangeable lens 2 is provided with the image stabilization function. A specific configuration of the image pickup device drive actuator 13 will be described in detail later with reference to FIG. 7.

The system controller 14 is a controlling portion configured to perform overall control of the whole camera in accordance with a predetermined processing program. That is, the system controller 14 not only controls an inside of the camera body 1 but also controls the interchangeable lens 2 by communicating with the LCU 22 via the electrical terminal of the lens mount 3.

More specifically, the system controller 14 is adapted to perform control in response to an operation input from the operation portion 17, and performs, for example, operations below in addition to the operations described above.

The system controller 14 converts an image pickup signal read from the image pickup device 12 to image data. Further, the system controller 14 generates a luminance image from the image signal read from the image pickup device 12 and performs pattern matching based on the luminance image as described later.

Furthermore, the system controller 14 communicates with the image stabilization microcomputer 15 to control start and end of image stabilization. Then, the system controller 14 communicates with the image stabilization microcomputer 15 to receive an amount of roll correction and performs roll correction as electronic correction.

The image stabilization microcomputer 15 calculates an amount of movement of an object image which occurs on the image plane of the image pickup device 12 based on a detection result of the angular velocity sensor 16, and drives the image pickup device drive actuator 13 so as to cause the image pickup device 12 to move in such a direction that the amount of movement of the object image is offset. A configuration and operation of an inside of the image stabilization microcomputer 15 will be described in detail later with reference to FIG. 3.

The angular velocity sensor 16 is provided being fixed to the camera body 1 of the camera and is a blur detection sensor configured to detect an angular velocity which occurs in the camera body 1. The angular velocity sensor 16 is provided with a yaw angular velocity sensor 16a, a pitch angular velocity sensor 16b and a roll angular velocity sensor 16c.

The yaw angular velocity sensor 16a, the pitch angular velocity sensor 16b and the roll angular velocity sensor 16c detect an angular velocity of rotation around the Y axis, an angular velocity of rotation around the X axis and an angular velocity of rotation around the Z axis (optical axis), respectively.

Here, though angular velocity sensors having a same function are used for all of the three angular velocity sensors 16a, 16b and 16c, mounting directions are different according to the axes targeted by rotation angular velocity detection (according to whether the X axis, the Y axis or the Z axis).

The operation portion 17 includes members such as buttons and switches, and is for a user to perform various operation inputs to the camera. Powering on/off of the camera, inputting of a still image photographing instruction, operations of starting and ending movie photographing, and the like are performed by the operation portion 17. An operation input from the operation portion 17 is notified to the system controller 14.

Figure 3:
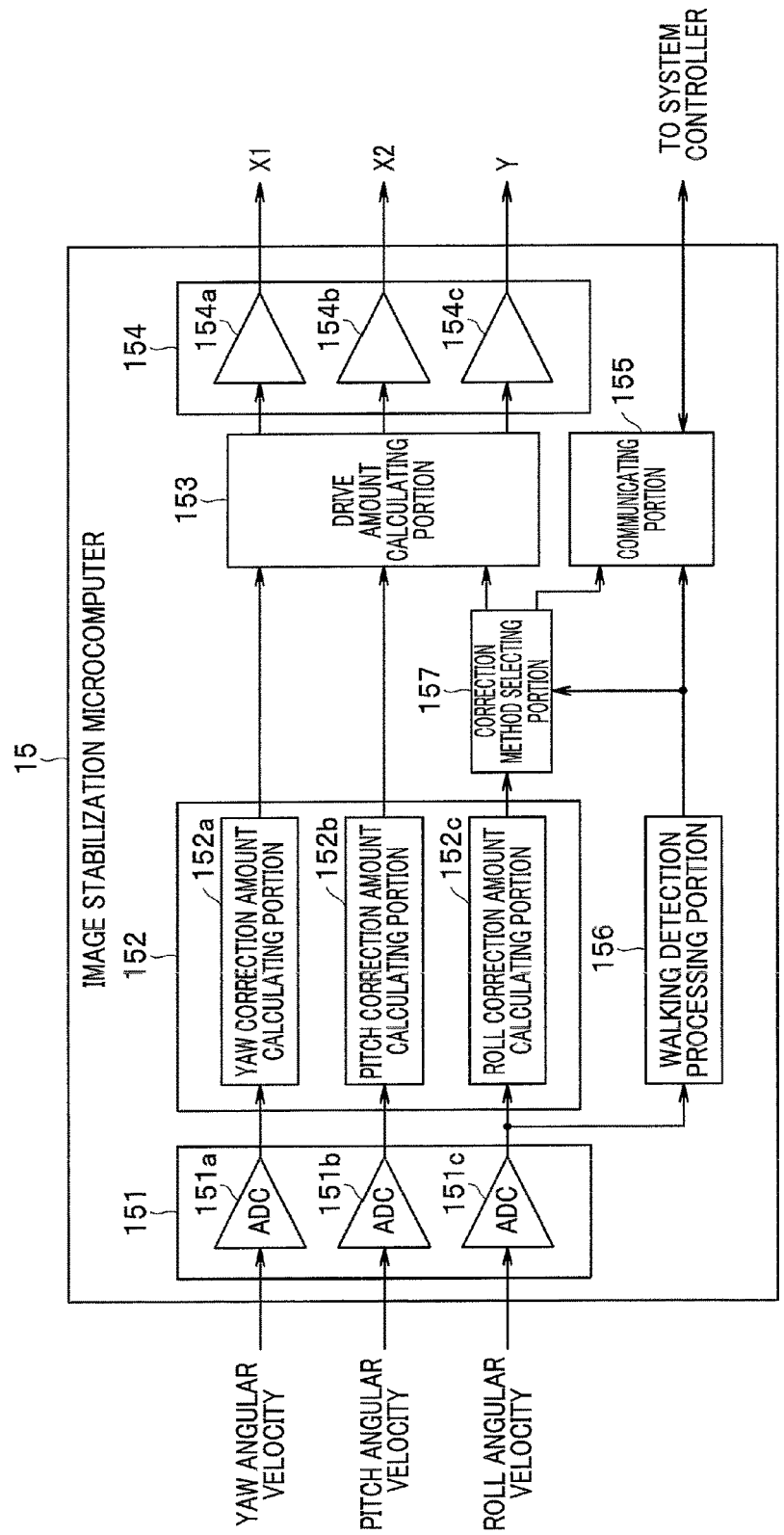
FIG. 3 is a block diagram showing a functional configuration of an image stabilization microcomputer in the first embodiment.

Next, FIG. 3 is a block diagram showing a functional configuration of the image stabilization microcomputer 15.

The image stabilization microcomputer 15 includes an analog/digital converter (ADC) 151, an angle correction amount calculating portion 152, a drive amount calculating portion 153, a driver 154, a communicating portion 155, a walking detection processing portion 156 and a correction method selecting portion 157 as processing function portions.

The ADC 151 converts a detection result outputted from the angular velocity sensor 16 as an analog signal to a digital signal. More specifically, the ADC 151 is provided with a first ADC 151a configured to convert a detection result of the yaw angular velocity sensor 16a to a digital value, a second ADC 151b configured to convert a detection result of the pitch angular velocity sensor 16b to a digital value and a third ADC 151c configured to convert a detection result of the roll angular velocity sensor 16c to a digital value.

The angle correction amount calculating portion 152 calculates an amount of correction in each of the rotation directions of yaw, pitch and roll based on the digital angular velocity outputted from the ADC 151. More specifically, the angle correction amount calculating portion 152 is provided with a yaw correction amount calculating portion 152a configured to calculate an amount of correction in the yaw direction based on an output of the ADC 151a, a pitch correction amount calculating portion 152b configured to calculate an amount of correction in the pitch direction based on an output of the ADC 151b and a roll correction amount calculating portion 152c configured to calculate an amount of correction in the roll direction based on an output of the ADC 151c. A configuration of an inside of each of the correction amount calculating portions 152a, 152b and 152c will be described later with reference to FIGS. 4 and 5.

Here, the angular velocity sensor 16, the ADC 151 and the angle correction amount calculating portion 152 constitute an image blur detection sensor configured to detect an amount of image blur in the translation direction and the rotation direction of an object image on the image plane.

The drive amount calculating portion 153 calculates an amount of drive for each of an X1 drive actuator 131, an X2 drive actuator 132 and a Y drive actuator 133 (see FIG. 7) to be described later, which are provided in the image pickup device drive actuator 13, based on values outputted from the angle correction amount calculating portion 152.

The driver 154 converts the amounts of drive outputted from the drive amount calculating portion 153 to drive signals for the respective drive actuators 131, 132 and 133 in the image pickup device drive actuator 13 and outputs the drive signal. More specifically, the driver 154 is provided with an X1 driver 154a configured to convert the amount of drive for the X1 drive actuator 131 to a drive signal and output the drive signal; an X2 driver 154b configured to convert the amount of drive for the X2 drive actuator 132 to a drive signal and output the drive signal and a Y driver 154c configured to convert the amount of drive for the Y drive actuator 133 to a drive signal and output the drive signal.

The communicating portion 155 communicates with the system controller 14 to acquire an instruction related to control for starting/ending of image stabilization or the like and acquire the optical characteristics of the photographing optical system 21 including a focal distance. The optical characteristics acquired here are used for processes of the yaw correction amount calculating portion 152a and the pitch correction amount calculating portion 152b and the like as described later (see FIG. 4). Further, the communicating portion 155 notifies the system controller 14 about a walking detection result to be described below.

The walking detection processing portion 156 is a walking detecting portion configured to detect which state the image pickup apparatus is in, a walking state or a non-walking state. That is, the walking detection processing portion 156 judges whether the camera is currently in the walking state or not based on an angular velocity in the roll direction outputted from the ADC 151c and outputs a judgment result to the correction method selecting portion 157 and the communicating portion 155. Details of the process by the walking detection processing portion 156 will be described later with reference to FIG. 6.

The correction method selecting portion 157 selects and decides a notification destination of an amount of a correction calculated by the roll correction amount calculating portion 152c based on the judgment result of the walking detection processing portion 156.

More specifically, if the judgment result of the walking detection processing portion 156 shows the non-walking state, the correction method selecting portion 157 notifies the drive amount calculating portion 153 of the amount of correction calculated by the roll correction amount calculating portion 152c. Thereby, in the case of non-walking state, correction in the roll direction is performed as optical correction by the image pickup device drive actuator 13.

Further, if the judgment result of the walking detection processing portion 156 shows the walking state, the correction method selecting portion 157 notifies the system controller 14 of the amount of correction calculated by the roll correction amount calculating portion 152c via the communicating portion 155. Thereby, in the case of walking state, correction in the roll direction is performed as electronic correction by the system controller 14. Details of the process inside the system controller 14 will be described later.

Figure 4:
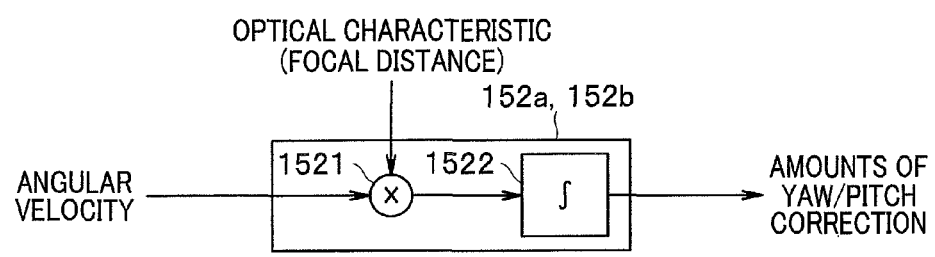
FIG. 4 is a block diagram showing an example of a configuration of a yaw correction amount calculating portion and a pitch correction amount calculating portion in the first embodiment.

FIG. 4 is a block diagram showing an example of a configuration of the yaw correction amount calculating portion 152a and the pitch correction amount calculating portion 152b.

Each of the yaw correction amount calculating portion 152a and the pitch correction amount calculating portion 152b is provided with a multiplying portion 1521 and an integrating portion 1522 as shown in FIG. 4.

When a yaw angular velocity is inputted to the yaw correction amount calculating portion 152a (or a pitch angular velocity is inputted to the pitch correction amount calculating portion 152b), the multiplying portion 1521 calculates an amount of movement of an object image in the yaw direction (the pitch direction in the case of the pitch correction amount calculating portion 152b), which occurs on the image plane of the image pickup device 12, for each predetermined time interval by performing multiplication by a coefficient based on the optical characteristics of the photographing optical system 21 (more specifically, a coefficient k(f) depending on a focal distance f which is a focal distance of the photographing optical system 21).

Here, the focal distance f of the photographing optical system 21 is periodically acquired from the LCU 22 by the system controller 14 and notified to the image stabilization microcomputer 15. Therefore, the image stabilization microcomputer 15 performs a multiplication process by the multiplying portion 1521 using the coefficient k(f) corresponding to the focal distance f at time of acquiring image data.

Next, the integrating portion 1522 performs time integration (more specifically, integration) of the amount of movement for each predetermined time interval calculated by the multiplying portion 1521 and outputs the amount of movement as a drive position (an amount of correction in the yaw direction/an amount of correction in the pitch direction) of the image pickup device drive actuator 13.

Figure 5:
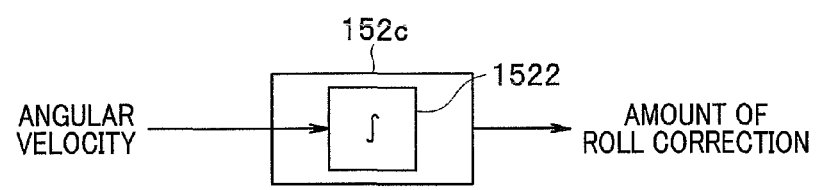
FIG. 5 is a block diagram showing an example of a configuration of a roll correction amount calculating portion in the first embodiment.

Further, FIG. 5 is a block diagram showing an example of a configuration of the roll correction amount calculating portion 152c.

As shown in FIG. 5, the roll correction amount calculating portion 152c is provided with the integrating portion 1522 but is not provided with the multiplying portion 1521 unlike the yaw correction amount calculating portion 152a and the pitch correction amount calculating portion 152b as shown in FIG. 5.

When a roll angular velocity is inputted to the roll correction amount calculating portion 152c, the integrating portion 1522 calculates an amount of rotation in the roll direction (more specifically, a rotation angle) on the image plane of the image pickup device 12 by performing time integration of the inputted roll angular velocity. The amount of rotation calculated in this way is outputted from the integrating portion 1522 as an amount of roll correction.

Figure 6:
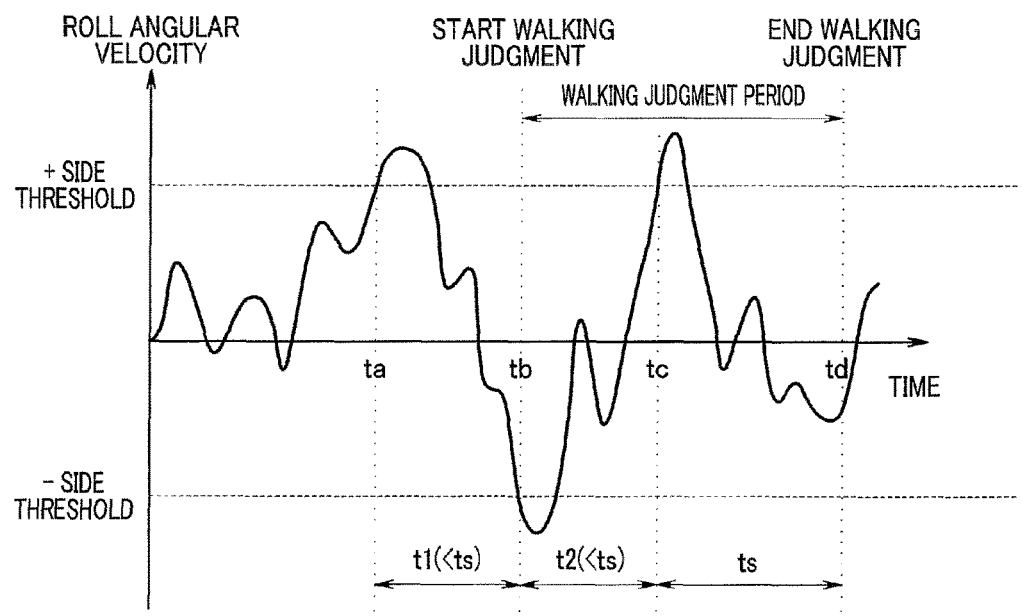
FIG. 6 is a chart showing an example of temporal change in a roll angular velocity for illustrating a process of a walking detection processing portion in the first embodiment.

Next, FIG. 6 is a chart showing an example of temporal change in a roll angular velocity for illustrating a process of the walking detection processing portion 156.

The walking detection processing portion 156 is adapted to judge that the camera is in the walking state if a roll angular velocity exceeds a + side angular velocity threshold and a − side angular velocity threshold alternately within a certain period ts and judge that the camera is in the non-walking state if the condition is not satisfied.

More specifically, in the example shown in FIG. 6, the roll angular velocity exceeds the + side angular velocity threshold at time ta. Further, it is at time tb that the roll angular velocity exceeds the − side angular velocity threshold for the first time after the time ta. Therefore, the walking detection processing portion 156 judges whether or not a time interval t1 from the time ta to the time tb is within the certain period ts. Since it is judged that the time interval t1 is within the certain period ts here, the walking detection processing portion 156 judges that the camera is in the walking state.

Furthermore, it is at time tc that the roll angular velocity exceeds the + side angular velocity threshold for the first time after the time tb. Therefore, the walking detection processing portion 156 judges whether or not a time interval t2 from the time tb to the time tc is within the certain period ts similarly to the above description. Since it is judged that the time interval t2 is within the certain period ts here also, the walking detection processing portion 156 continues the judgment that the camera is in the walking state.

Furthermore, the walking detection processing portion 156 waits for the roll angular velocity to exceed the − side angular velocity threshold after the time tc. In the example shown in FIG. 6, since the roll angular velocity does not exceed the − side angular velocity threshold within the certain period ts after the time tc, the walking detection processing portion 156 releases the judgment that the camera is in the walking state (judges that the camera is not in the walking state) at time td when a time period corresponding to the certain period ts has elapsed after the time tc.

By performing such a process, the walking detection processing portion 156 judges that the camera is in the walking state during a period from the time tb to the time td and judges that the camera is in the non-walking state in other periods, if the roll angular velocity shows such temporal change as shown in FIG. 6.

Figure 7:
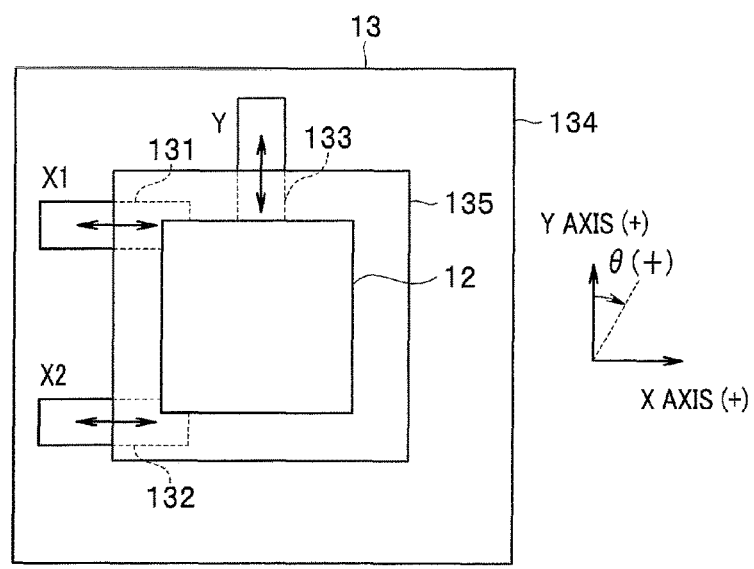
FIG. 7 is a diagram showing a schematic configuration example of an image pickup device drive actuator in the first embodiment.

Next, FIG. 7 is a diagram showing a schematic configuration example of the image pickup device drive actuator 13. FIG. 7 is a diagram when the image pickup device drive actuator 13 is seen, with the − direction of the Z axis (a direction when the image side is seen from the object side) as a line-of-sight direction.

Therefore, directions corresponding to the X axis and the Y axis in FIG. 1 are shown in FIG. 7, and a right direction and an upward direction on paper indicate a positive direction of the X axis and a positive direction of the Y axis, respectively. Further, the angle θ indicating an amount of roll rotation around the Z axis is shown in FIG. 7, and the angle θ is defined so that a clockwise direction is a positive direction (that is, a counterclockwise direction is a negative direction).

The image pickup device drive actuator 13 is provided with the X1 drive actuator 131, the X2 drive actuator 132, the Y drive actuator 133, a fixed portion 134 and a movable portion 135.

The fixed portion 134 is fixed to the camera body 1 constituting the image pickup apparatus and movably supports the movable portion 135.

The movable portion 135 integrally holds the image pickup device 12, and is movable as described above in a plane parallel to the image plane (that is, a plane vertical to the optical axis of the photographing optical system 21) relative to the fixed portion 134.

The drive actuator 131, 132 and 133 are such that cause the fixed portion 134 to move by giving driving force to the movable portion 135. As an example of a specific configuration, each of the drive actuator 131, 132 and 133 is an electromagnetic linear motor (such as a voice coil motor) configured including an electromagnetic coil not shown which is arranged being integrated with the movable portion 135 and a stationary magnet not shown which is arranged on the fixed portion 134.

Drive voltages (drive currents) are supplied to the electromagnetic coil of the X1 drive actuator 131, the electromagnetic coil of the X2 drive actuator 132 and the electromagnetic coil of the Y drive actuator 133 from the X1 driver 154a, the X2 driver 154b and the Y driver 154c in the image stabilization microcomputer 15 described above, respectively, as the drive signals described above.

When the drive voltages are supplied, drive currents in proportion to the drive voltages flow through the respective electromagnetic coils of the drive actuators 131, 132 and 133, and magnetic fields occur. The magnetic fields caused by the electromagnetic coils interact with the stationary magnets and cause drive forces in proportion to the drive currents to occur between the electromagnetic coils and the stationary magnets. Since the stationary magnets are fixed to the fixed portion 134, the movable portion 135 on which the electromagnetic coils are arranged is caused to move by the occurred drive force.

The X1 drive actuator 131 is arranged, for example, on an upper left end portion of the movable portion 135 so as to give drive force in an X axis direction. Further, the X2 drive actuator 132 is arranged, for example, on a lower left end portion of the movable portion 135 so as to give drive force in the X axis direction. Furthermore, the Y drive actuator 133 is arranged, for example, on a top end center portion of the movable portion 135 so as to give drive force in a Y axis direction. Thus, in order to cause the image pickup device 12 to move into the face parallel to the image plane, the image pickup device drive actuator 13 adopts, for example, a drive stage mechanism.

In such a configuration, the image pickup device 12 is caused to translationally move in the Y direction by giving a drive voltage to the electromagnetic coils of the Y drive actuator 133.

Further, by giving a same drive voltage to the electromagnetic coil of the X1 drive actuator 131 and the electromagnetic coil of the X2 drive actuator 132, an amount of movement of the X1 drive actuator 131 and an amount of movement of the X2 drive actuator 132 become same, and the image pickup device 12 is translated in the X direction.

Furthermore, by giving different positive and negative drive voltages respectively to the electromagnetic coil of the X1 drive actuator 131 and the electromagnetic coil of the X2 drive actuator 132, the amount of movement of the X1 drive actuator 131 and the amount of movement of the X2 drive actuator 132 become values with different signs, and the image pickup device 12 is rotationally moved.

Therefore, more generally, by giving different drive voltages to the electromagnetic coil of the X1 drive actuator 131 and the electromagnetic coil of the X2 drive actuator 132, the amount of movement of the X1 drive actuator 131 and the amount of movement of the X2 drive actuator 132 become different values, and the image pickup device 12 is not only translated in the X direction but also rotationally moved.

An amount of rotational movement of the image pickup device 12 at this time which is indicated by the angle θ is a value in proportion to a difference between an amount of movement MX2 of the X2 drive actuator 132 and an amount of movement MX1 of the X1 drive actuator 131 as shown by an equation below if the angle θ is a minute value.

$$\theta = K \cdot (MX2 - MX1)$$

Here, K is a proportionality coefficient which is a constant determined by arrangement of the X1 drive actuator 131 and the X2 drive actuator 132 relative to the movable portion 135.

Thus, for example, by adopting the mechanism as shown in FIG. 7, the image pickup device drive actuator 13 can cause the image pickup device 12 to not only translationally move in an X/Y direction but also rotationally move in the plane parallel to the image plane. However, since the configuration shown in FIG. 7 is merely an example, other configuration may be adopted.

Figure 8:
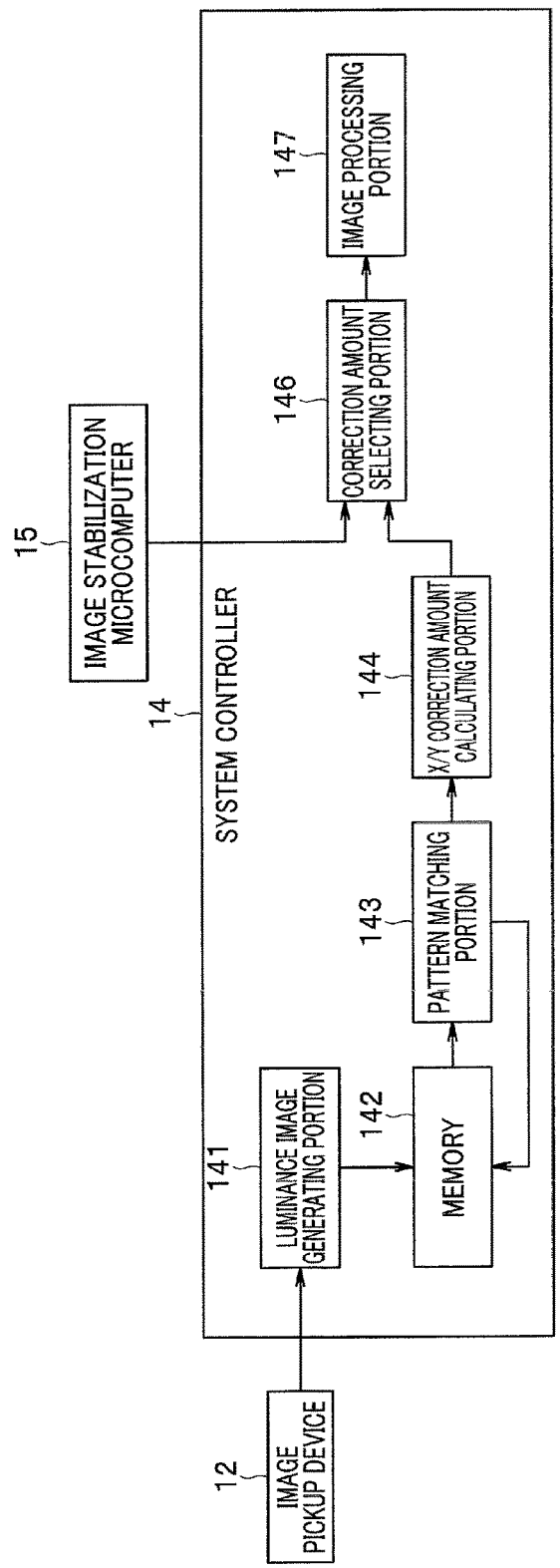
FIG. 8 is a block diagram showing a functional configuration of a system controller in the first embodiment.

Next, FIG. 8 is a block diagram showing a functional configuration of the system controller 14. Note that, though the system controller 14 is provided with various functional portions, functional portions related to electronic image stabilization shown in FIG. 8 will be described here, and description of other functional portions will be omitted.

As shown in FIG. 8, the system controller 14 is provided with a luminance image generating portion 141, a memory 142, a pattern matching portion 143, an X/Y correction amount calculating portion 144, a correction amount selecting portion 146 and an image processing portion 147.

The luminance image generating portion 141 converts an image pickup signal read from the image pickup device 12 to a luminance image.

The memory 142 is a storage medium configured to store the luminance image generated by the luminance image generating portion 141. Here, the luminance image is stored in an area which can store luminance images corresponding to a plurality of frames and which is secured in the memory 142 in advance. Further, the memory 142 also stores vector information which is outputted from the pattern matching portion 143 as described later.

The pattern matching portion 143 selects two frames (for example, two frames acquired at two consecutive time points) from among a plurality of frames of luminance images acquired at different time points and stored in the memory 142, performs pattern matching, calculates vector information indicating an amount of image movement between the two frames of images and outputs the vector information as an amount of remaining blur in the translation direction. A well-known technique can be appropriately used for the pattern matching. The vector information outputted from the pattern matching portion 143 in this way is stored into the memory 142 as described above.

The X/Y correction amount calculating portion 144 calculates each of an amount of correction in the X direction and an amount of correction in the Y direction based on the vector information calculated by the pattern matching portion 143.

Figure 9:
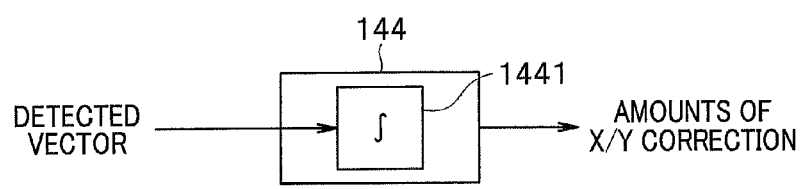
FIG. 9 is a block diagram showing an example of a configuration of an X/Y correction amount calculating portion in the first embodiment.

Here, FIG. 9 is a block diagram showing an example of a configuration of the X/Y correction amount calculating portion 144.

In the example shown in FIG. 9, the X/Y correction amount calculating portion 144 is provided with an integrating portion 1441.

When the vector information calculated by the pattern matching portion 143 is inputted, the X/Y correction amount calculating portion 144 performs time integration (more specifically, integration) of the inputted vector by the integrating portion 1441, and outputs a result of the integration to the correction amount selecting portion 146 as an amount of correction.

Thus, the luminance image generating portion 141, the memory 142, the pattern matching portion 143 and the X/Y correction amount calculating portion 144 constitute a remaining blur amount calculating portion configured to calculate an amount of remaining blur in the translation direction which remains after optical correction, based on a plurality pieces of image data acquired at different acquisition time points by performing optical correction.

The correction amount selecting portion 146 decides a value to be outputted to the image processing portion 147 based on a judgment result of the walking detection processing portion 156 received from the communicating portion 155 of the image stabilization microcomputer 15.

More specifically, if the judgment result by the walking detection processing portion 156 shows the non-walking state, the correction amount selecting portion 146 outputs the amount of correction calculated by the X/Y correction amount calculating portion 144 (the amount of remaining blur in the translation direction) to the image processing portion 147. Therefore, in the case of non-walking state, the amount of remaining blur in the translation direction is corrected by the image processing portion 147 which is an electronic correction portion.

Further, if the judgment result by the walking detection processing portion 156 shows the walking state, the correction amount selecting portion 146 outputs the amount of correction received from the communicating portion 155 of the image stabilization microcomputer 15 (the amount of roll correction calculated by the roll correction amount calculating portion 152c) to the image processing portion 147.

The image processing portion 147 is an electronic correction portion configured to cut out a part of image data and cause the part to be an output image. More specifically, the image processing portion 147 performs cutting-out of an image of a cut-out area, which is a part of image data, based on an amount of correction received from the correction amount selecting portion 146 and causes the cut-out image to be an output image. Therefore, the image processing portion 147 performs cutting-out of an image so as to correct an amount of remaining blur in the translation direction in the case of non-walking state and performs cutting-out of an image so as to correct image blur in the roll direction in the case of walking state.

Figure 10:
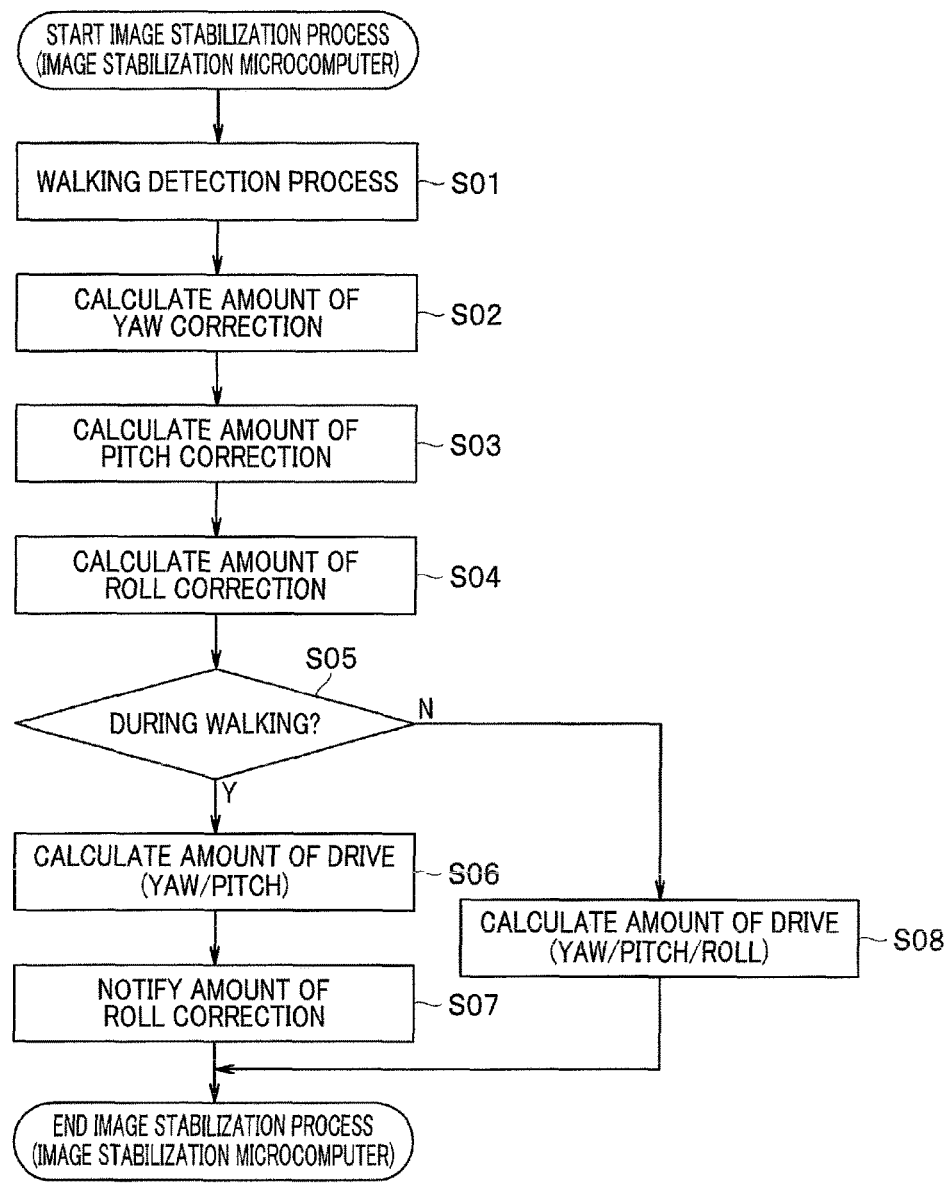
FIG. 10 is a flowchart showing a process of the image stabilization microcomputer in image stabilization of the image pickup apparatus of the first embodiment.

Next, FIG. 10 is a flowchart showing a process of the image stabilization microcomputer 15 in image stabilization of the image pickup apparatus.

When the image stabilization process is started, the walking detection processing portion 156 performs the walking detection process as described above based on roll angular velocity information converted to a digital value by the third ADC 151*c* and judges whether the camera is in the walking state or not (step S01).

Then, the yaw correction amount calculating portion 152*a* calculates an amount of correction in the yaw direction based on yaw angular velocity information converted to a digital value by the ADC 151*a* (step S02).

Furthermore, the pitch correction amount calculating portion 152*b* calculates an amount of correction in the pitch direction based on pitch angular velocity information converted to a digital value by the ADC 151*b* (step S03).

Then, the roll correction amount calculating portion 152*c* calculates an amount of correction in the roll direction based on roll angular velocity information converted to a digital value by the ADC 151*c* (step S04).

After that, the correction method selecting portion 157 judges whether a result of the process at step S01 described above shows the walking state or not (step S05).

Here, if it is judged that the result of the process shows the walking state, the drive amount calculating portion 153 calculates an amount of drive to be specified to the image pickup device drive actuator 13 based on the amount of yaw correction calculated by step S02 and the amount of pitch correction calculated by step S03. The amount of drive calculated in this way is outputted to the image pickup device drive actuator 13 via the driver 154 (step S06).

Furthermore, the correction method selecting portion 157 transmits the amount of roll correction calculated by step S04 to the system controller 14 via the communicating portion 155 (step S07).

On the other hand, if it is judged at step S05 that the result of the process shows the non-walking state, the correction method selecting portion 157 outputs the amount of roll correction calculated by step S04 to the drive amount calculating portion 153. Thereby, the drive amount calculating portion 153 calculates the amount of drive to be specified to the image pickup device drive actuator 13 based on the amount of yaw correction calculated by step S02, the amount of pitch correction calculated by step S03 and the amount of roll correction calculated by step S04. The amount of drive calculated in this way is outputted to the image pickup device drive actuator 13 via the driver 154 (step S08).

When the process of step S07 or step S08 has been performed, the image stabilization process by the image stabilization microcomputer 15 ends.

Next, FIG. 11 is a flowchart showing a process of the system controller 14 in the image stabilization of the image pickup apparatus.

When the image stabilization process is started, the correction amount selecting portion 146 judges whether the camera is in the walking state or not, based on a detection result acquired from the walking detection processing portion 156 in the image stabilization microcomputer 15 via the communicating portion 155 (step S11).

Here, if it is judged that the camera is in the walking state, the correction amount selecting portion 146 further acquires an amount of roll correction calculated by the roll correction amount calculating portion 152*c* in the image stabilization microcomputer 15 via the correction method selecting portion 157 and the communicating portion 155 (step S12).

Then, the image processing portion 147 performs roll correction by performing cutting-out of an image from image data based on the amount of roll correction acquired at step S12 (step S13).

On the other hand, if it is judged at step S11 that the camera is in the non-walking state, after reading luminance images corresponding to two frames acquired at different time points, which have been generated by the luminance image generating portion 141 and stored in the memory 142, the pattern matching portion 143 performs pattern matching and stores vector information obtained as a result of the pattern matching into the memory 142 (step S14).

Next, the X/Y correction amount calculating portion 144 calculates amounts of X/Y correction (that is, an amount of correction in the X direction and an amount of correction in the Y direction) based on the vector information read from the memory 142 (step S15).

Then, the image processing portion 147 performs correction of remaining blur in the X direction and the Y direction (X/Y correction) by performing cutting-out of an image from image data based on the calculated amounts of X/Y correction (step S16).

When the process of step S13 or step S16 has been performed in this way, the image stabilization process by the system controller 14 ends.

Figure 13:
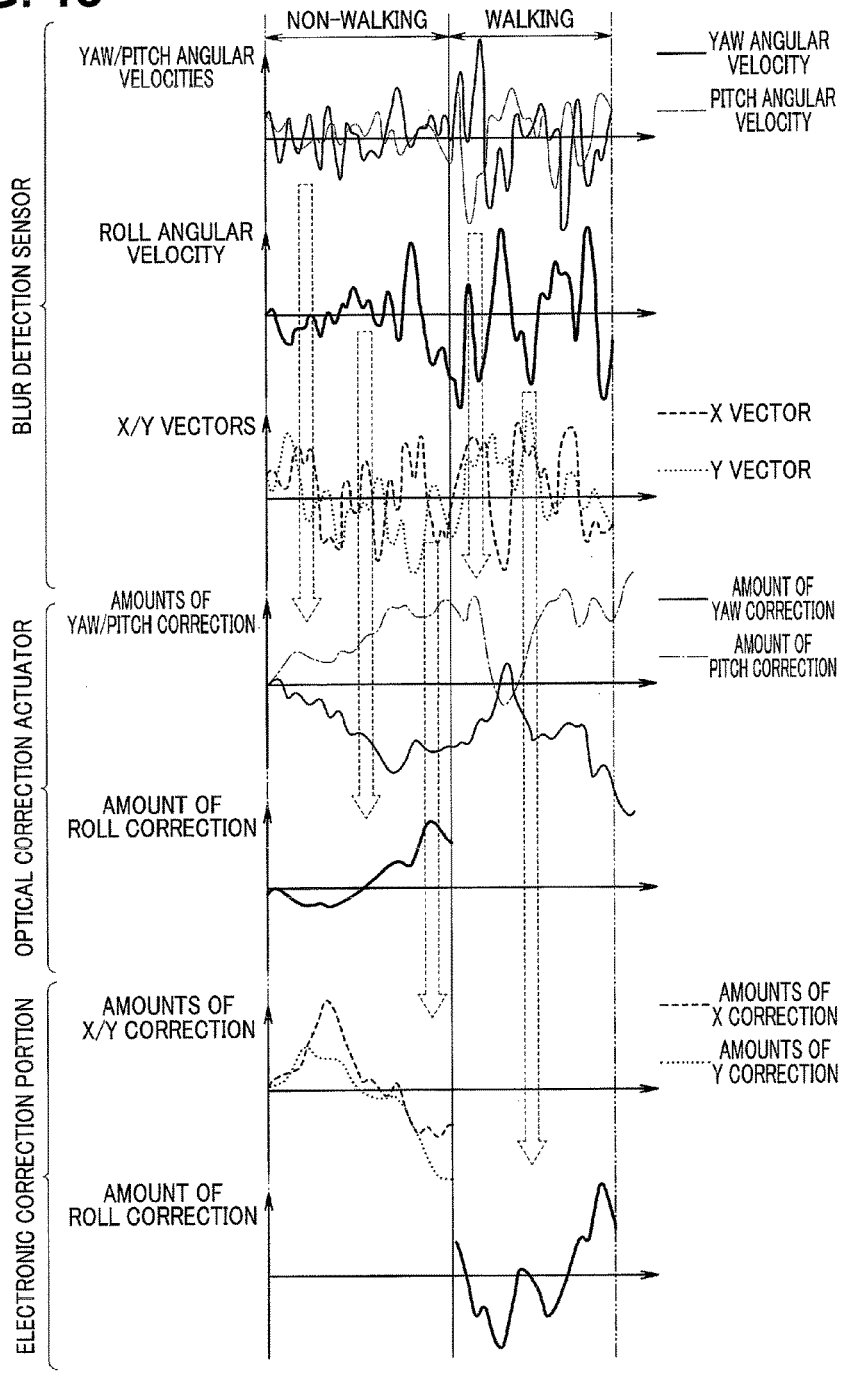
FIG. 13 is a chart showing that the electronic correction and the optical correction are properly used depending on whether a blur detection result indicates the walking state or not, in the first embodiment.

FIG. 12 is a table showing proper use of electronic correction and optical correction depending on whether the walking state or not, and obtained effects; and FIG. 13 is a chart showing that the electronic correction and the optical correction are properly used depending on whether a blur detection result indicates the walking state or not.

As described above, in the present embodiment, electronic correction and optical correction are properly used based on whether a detection result of the walking detection processing portion 156 based on a roll angular velocity shows the walking state or not.

First, in the case of non-walking state, the image pickup device drive actuator 13 is driven based on control of the image stabilization microcomputer 15; and optical image stabilization in the yaw direction and the pitch direction is performed based on a yaw angular velocity and a pitch angular velocity, while optical image stabilization in the roll direction is performed based on a roll angular velocity. Furthermore, the system controller 14 detects blur remaining in an image acquired after the optical correction (so-called remaining blur) by pattern matching, calculates amounts of X/Y correction, performs cutting-out of an image from image data and performs electronic correction.

Thereby, in the non-walking state, blur can be suppressed almost completely because remaining blur as a result of performing optical correction is further electronically corrected.

On the other hand, in the case of walking state, the image pickup device drive actuator 13 is driven based on control of the image stabilization microcomputer 15; and optical image stabilization in the yaw direction and the pitch direction is performed based on a yaw angular velocity and a pitch angular velocity. However, optical correction is not applied to blur in the roll direction. For the blur in the roll direction which has occurred in an image acquired after the optical correction in the yaw direction and the pitch direction, the system controller 14 performs cutting-out of an image from image data based on the amount of roll correction acquired from the image stabilization microcomputer 15 and performs electronic correction. At this time, correction of an amount of remaining blur in the X direction and the Y direction by the system controller 14 is not performed.

For example, when roll correction is performed by optical correction, the square movable portion 135 rotates within a movable range allowed by a square frame of the fixed portion 134, but an amount of movability in the X direction and an amount of movability in the Y direction of the movable portion 135 in a rotated state within the square frame of the fixed portion 134 become smaller than those in a non-rotated state (because the movable portion 135 forms a square shape, and, therefore, ranges the movable portion 135 occupies in the X direction and the Y direction become longer than lengths of a longitudinal side and a lateral side of the movable portion 135, respectively, in the rotated state) as shown in FIG. 7.

Blur in all of the yaw, pitch and roll directions is larger during walking than during not walking; and, therefore, when roll correction is performed by optical correction, a correction limit of optical correction is easily reached. In this case, correction has to be done only by electronic correction. However, though it is possible to perform correction of moving an object composition, for image data obtained by exposure by electronic correction, it is not possible to correct image blur which occurs during the exposure. Therefore, in comparison with optical correction, image blur occurs in image data itself, and resolution easily decreases. Therefore, when the state of (optical correction+electronic correction) changes to the state of only electronic correction, a steep change in resolution of an image appears in a movie, and image quality deteriorates.

Further, especially during walking, blur in the roll direction is large, and the correction limit of optical correction is reached more easily. Therefore, blur in the roll direction corresponding to a deficient amount of correction easily remains in a movie after optical correction, and it is difficult to obtain a stable movie.

In comparison, according to the present embodiment, since optical correction is not applied to the roll direction during walking, optical correction in the yaw direction and the pitch direction can be performed with a wider correction width for that. Therefore, performances of optical correction in the yaw direction and the pitch direction can be enhanced higher than during not walking.

Furthermore, though blur in the roll direction is large during walking, electronic correction is used only for image stabilization in the roll direction and is not used for X/Y correction, and, therefore, it is possible to secure a large correction range in the roll direction by electronic correction and sufficiently correct blur in the roll direction. Thus, it is possible to obtain a stable movie.

Note that, though image blur in a rotation direction is corrected by the electronic correction portion, with an amount of correction of image blur in the rotation direction by the optical correction actuator set to 0 in the case of walking state, and image blur in a rotation direction is corrected by the optical correction actuator, with an amount of correction of image blur in the rotation direction by the electronic correction portion set to 0 in the case of non-walking state in the description above, this is not limiting.

That is, it is sufficient only to cause the amount of correction of the image blur in the rotation direction by the optical correction actuator to be smaller and cause the amount of correction of the image blur in the rotation direction by the electronic correction portion to be larger in the case of walking state than in the case of non-walking state. In this case also, since the amount of correction of the image blur in the rotation direction by the optical correction actuator is caused to be small, it is possible to cause the amount of correction of the image blur in the translation direction by the optical correction actuator to be large, and it is possible to improve performance of image stabilization in the translation direction during walking. Further, since it is also possible to correct remaining image blur in the rotation direction by the electronic correction portion, the image blur in the rotation direction can be effectively reduced.

Further, in the embodiment described above, the walking detection processing portion 156, which is a walking detecting portion, detects whether the camera is in the walking state or not, based on a degree of image blur in the rotation direction detected by the image blur detection sensor (that is, roll angular velocity information outputted from the ADC 151$c$), but this is not limiting. For example, a dedicated independent walking detection processing portion may be provided, or whether the camera is in the walking state or not may be detected by other appropriate means.

According to the first embodiment as described above, whether the camera is in the walking state or not is detected; and, if the camera is in the walking state, the amount of optical correction of image blur in the rotation direction by the image pickup device drive actuator 13 is caused to be smaller, and the amount of electronic correction of image blur in the rotation direction by the system controller 14 is caused to be larger than in the case of non-walking state, so that it is possible to improve the performance of correction of blur including blur in the roll direction (the image rotation direction) in the walking state and secure stable framing.

At this time, in the case of walking state, the image blur in the rotation direction is corrected by the system controller 14, with the amount of correction of image blur in the rotation direction by the image pickup device drive actuator 13 set to 0; and in the case of non-walking state, the image blur in the rotation direction is corrected by the image pickup device drive actuator 13, with the amount of correction of image blur in the rotation direction by the system controller 14 set to 0. Therefore, it is possible to enhance the performance of image stabilization in the translation direction in the case of walking state to the maximum.

The blur in the roll direction (image blur in the rotation direction) is less influenced by movement of an object optical image during an exposure period of an image of one frame, that is, image blur which occurs in an image of one frame is smaller than the blur in the yaw direction and the pitch direction (image blur due to translation in horizontal and vertical directions). Therefore, even if image stabilization in the rotation direction is performed only by electronic correction without performing optical correction, image quality deterioration is relatively small. Thus, it is possible to favorably correct blur in the roll direction during walking even only by electronic correction.

Further, in the case of non-walking state, an amount of remaining blur in the translation direction, which remains after optical correction, is calculated by the remaining blur amount calculating portion based on a plurality of pieces of image data acquired at different acquisition time points by performing optical correction, and the amount of remaining blur in the translation direction is electronically corrected by the system controller 14. Therefore, it is possible to eliminate blur during not walking almost completely.

Furthermore, in the case of calculating the amount of remaining blur in the translation direction based on a result of pattern matching, it is possible to make an accurate judgment based on image data itself.

Furthermore, since the walking detection processing portion 156 is adapted to detect which state the camera is in, the walking state or the non-walking state, based on a degree of image blur in the rotation direction detected by the angular velocity sensor 16 and the image stabilization microcomputer 15, it is not necessary to separately provide a dedicated sensor or the like, and it is possible to perform walking detection corresponding to a motion of a human being that walks on two legs.

Second Embodiment

Figure 14:
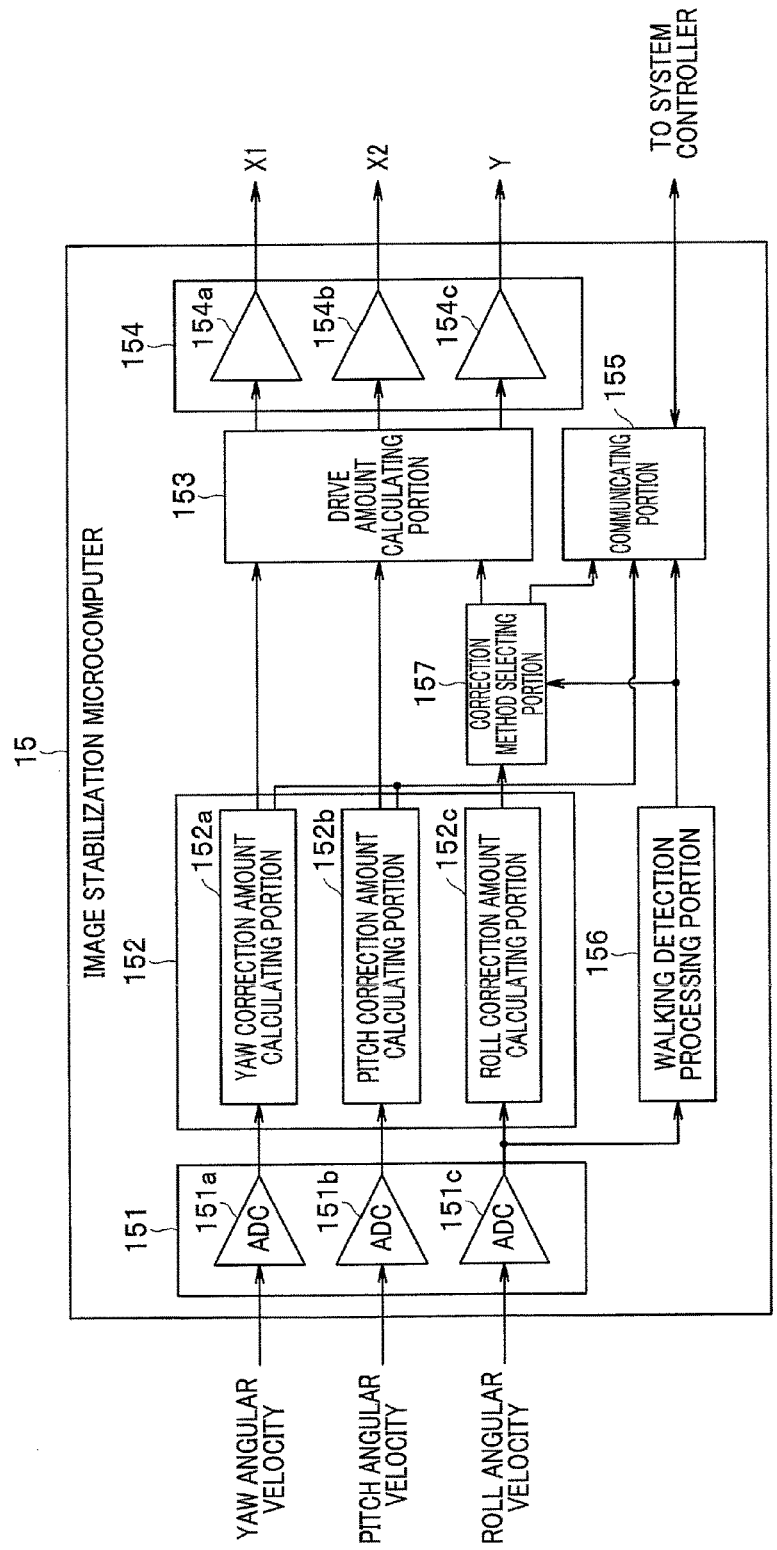
FIG. 14 is a block diagram showing a functional configuration of an image stabilization microcomputer in a second embodiment of the present invention.

FIGS. 14 to 18 show a second embodiment of the present invention, and FIG. 14 is a block diagram showing a functional configuration of the image stabilization microcomputer 15.

In the second embodiment, portions similar to those in the first embodiment described above are given same reference numerals, and description of the portions will be appropriately omitted. Description will be made mainly on only different points.

Figure 15:
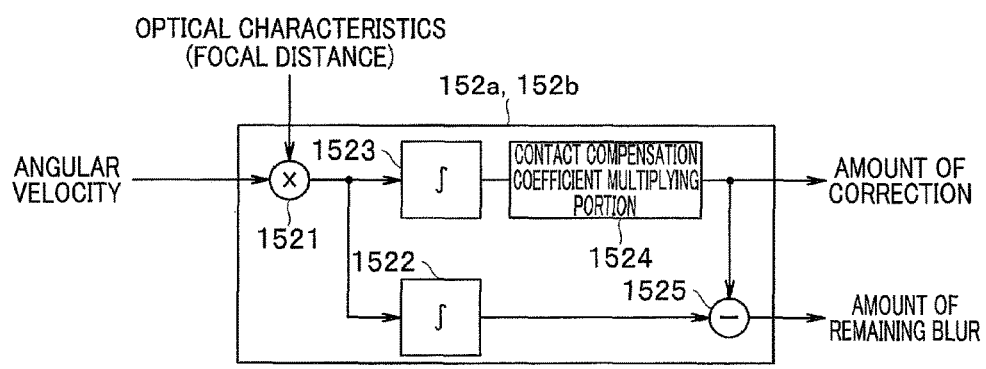
FIG. 15 is a block diagram showing an example of a configuration of a yaw correction amount calculating portion and a pitch correction amount calculating portion in the second embodiment.

As shown in FIG. 15 described later, the yaw correction amount calculating portion 152a and the pitch correction amount calculating portion 152b of the image stabilization microcomputer 15 of the present embodiment are adapted not only to calculate the amount of yaw correction and the amount of pitch correction to be outputted to the drive amount calculating portion 153, respectively, but also calculate the amount of remaining blur in the yaw direction and the amount of remaining blur in the pitch direction, respectively.

The amounts of remaining blur calculated by the yaw correction amount calculating portion 152a and the pitch correction amount calculating portion 152b, respectively, are transmitted to the system controller 14 via the communicating portion 155 as shown in FIG. 14.

Here, FIG. 15 is a block diagram showing an example of a configuration of the yaw correction amount calculating portion 152a and the pitch correction amount calculating portion 152b.

Each of the yaw correction amount calculating portion 152a and the pitch correction amount calculating portion 152b is provided with the multiplying portion 1521, the integrating portion 1522, an integrating portion 1523, a contact compensation coefficient multiplying portion 1524 and a subtracting portion 1525 as shown in FIG. 15.

When a yaw angular velocity is inputted to the yaw correction amount calculating portion 152a (or a pitch angular velocity is inputted to the pitch correction amount calculating portion 152b), the multiplying portion 1521 calculates an amount of movement of an object image in the yaw direction (in the pitch direction in the case of the pitch correction amount calculating portion 152b), which occurs on the image plane of the image pickup device 12, for each predetermined time interval by performing multiplication by a coefficient based on the optical characteristics of the photographing optical system 21 (the coefficient k(f) described above) as described above.

Each of the amounts of movement calculated by the multiplying portion 1521 are inputted to the integrating portion 1522 and the integrating portion 1523.

Then, the integrating portion 1522 and the integrating portion 1523 perform time integration of the amount of movement for each predetermined time period and outputs a result as a drive position (the amount of correction in the yaw direction/the amount of correction in the pitch direction) of the image pickup device drive actuator 13.

Note that, though the integrating portion 1522 and the integrating portion 1523 are independently provided in the configuration example shown in FIG. 15, the integrating portions 1522 and 1523 may be integrated into one so that a calculation result is outputted from the integrated integrating portion to the contact compensation coefficient multiplying portion 1524 and the subtracting portion 1525.

The contact compensation coefficient multiplying portion 1524 is a limit correction relieving portion configured to suppress a translation-direction optical correction function when a correction limit of the image pickup device drive actuator 13 is approached. For example, the contact compensation coefficient multiplying portion 1524 multiplies an amount of image blur in the translation direction detected by the angular velocity sensor 16 and the image stabilization microcomputer 15 by a contact compensation coefficient for suppressing the translation-direction optical correction function before such a correction limit that the movable portion 135 comes into contact with the fixed portion 134 is reached.

More specifically, the contact compensation coefficient multiplying portion 1524 multiplies the drive position (the amount of correction in the yaw direction/the amount of correction in the pitch direction) calculated by the integrating portion 1523 by the contact compensation coefficient. Here, if the drive position calculated by the integrating portion 1523 is used as it is when the correction limit of optical correction by the image pickup device drive actuator 13 (that is, a position where the movable portion 135 comes into contact with the fixed portion 134, which is as shown in FIG. 7) is approached before the correction limit is reached, the movable portion 135 may come into contact with the fixed portion 134 quickly. Therefore, the compensation coefficient is such a coefficient that suppresses an amount of movement of the movable portion 135 relative to the drive position calculated by the integrating portion 1523 (for example, a coefficient below 1, a value of which decreases as the correction limit is approached). By performing such a process, the movable portion 135 gradually comes close to the fixed portion 134 in a vicinity of the position of coming into contact with the fixed portion 134.

Thus, the drive position (the amount of correction in the yaw direction/the amount of correction in the pitch direction) corrected by the contact compensation coefficient multiplying portion 1524 is outputted to the drive amount calculating portion 153 as an amount of correction.

Further, the subtracting portion 1525 is a remaining blur amount calculating portion configured to calculate an amount of remaining blur by subtracting, from an amount of image blur in the translation direction, an amount of the image blur in the translation direction corrected by the image pickup device drive actuator 13. More specifically, the subtracting portion 1525 calculates amounts of remaining blur in the yaw direction and the pitch direction remaining after optical correction by subtracting, from a drive position calculated by the integrating portion 1522, the drive position corrected by the contact compensation coefficient multiplying portion 1524.

The amount of remaining blur calculated in this way is transmitted to the system controller 14 via the communicating portion 155 as described above.

Figure 16:
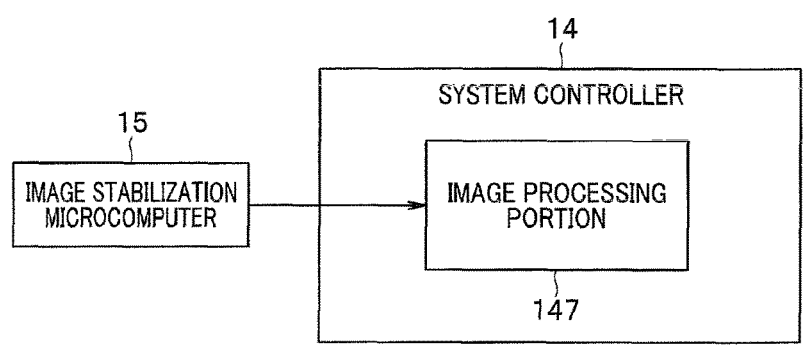
FIG. 16 is a block diagram showing a functional configuration of a system controller in the second embodiment.

Next, FIG. 16 is a block diagram showing a functional configuration of the system controller 14. Note that, in FIG. 16 also, functional portions related to electronic image stabilization among various functions the system controller 14 is provided with are shown similarly to FIG. 8.

The system controller 14 is provided with the image processing portion 147 as shown in FIG. 16. That is, in the present embodiment, it is not necessary to perform pattern matching to determine amounts of remaining blur corresponding to amounts of X/Y correction because the amount of remaining blur is received from the image stabilization microcomputer 15. Therefore, the system controller 14 of the present embodiment is configured by deleting the luminance image generating portion 141, the memory 142, the pattern matching portion 143, the X/Y correction amount calculating portion 144 and the correction amount selecting portion 146 from the configuration shown in FIG. 8.

The system controller 14 performs amounts of remaining blur in the yaw direction and the pitch direction by performing cutting-out of an image from image data using the received amount of remaining blur in the yaw direction as an amount of X correction and using the received amount of remaining blur in the pitch direction as an amount of Y correction.

Figure 17:
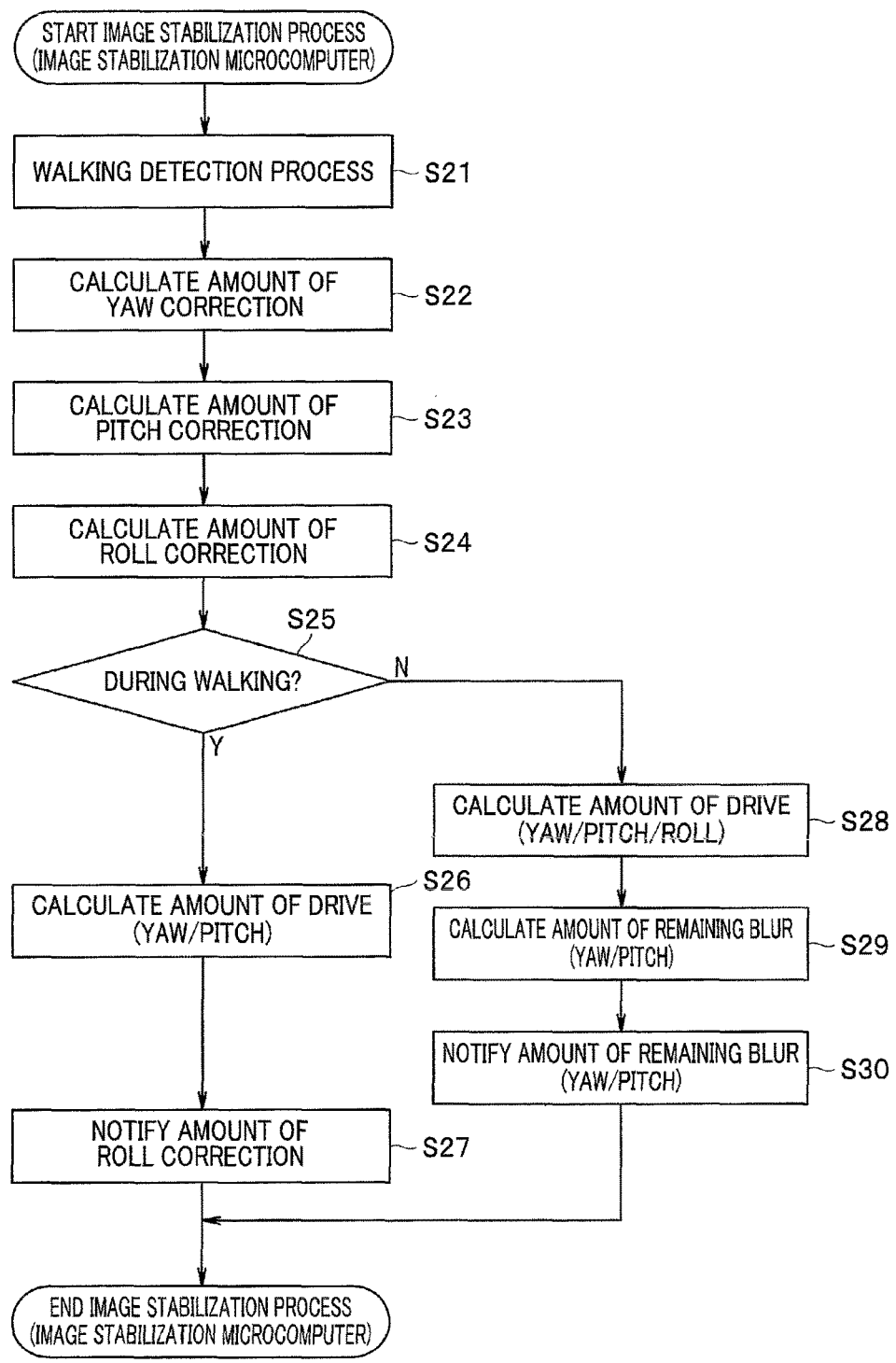
FIG. 17 is a flowchart showing a process of the image stabilization microcomputer in image stabilization of an image pickup apparatus of the second embodiment.

Next, FIG. 17 is a flowchart showing a process of the image stabilization microcomputer 15 in image stabilization of the image pickup apparatus.

When the process is started, processes of steps S21 to S25 are performed similarly to the processes of steps S01 to S05 shown in FIG. 10.

Then, if it is judged at step S25 that the camera is in the walking state, processes of steps S26 and S27 are performed similarly to the processes of steps S06 and S07 shown in FIG. 10.

Further, if it is judged at step S25 that the camera is in the non-walking state, a process of step S28 is performed similarly to the process of step S08 shown in FIG. 10.

Next, the yaw correction amount calculating portion 152*a* and the pitch correction amount calculating portion 152*b* calculate amounts of remaining blur in the yaw direction and the pitch direction in optical correction as described above (step S29).

Furthermore, the amounts of remaining blur determined at step S29 are outputted to the system controller 14 via the communicating portion 155 (step S30).

When the process of step S27 or step S30 has been performed in this way, the image stabilization process by the image stabilization microcomputer 15 ends.

Figure 18:
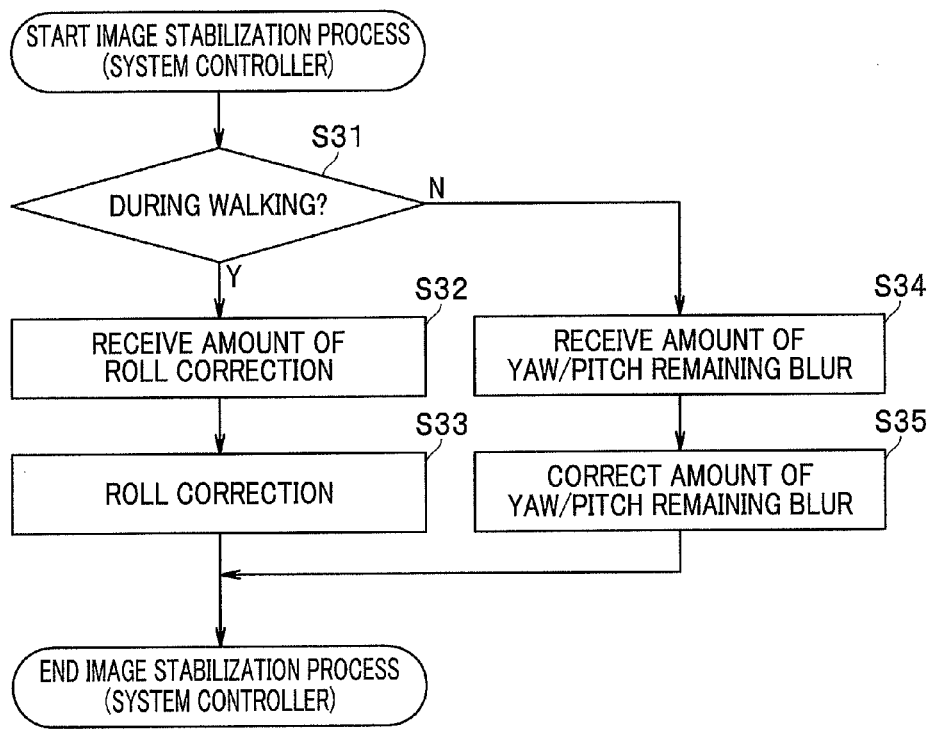
FIG. 18 is a flowchart showing a process of the system controller in the image stabilization of the image pickup apparatus of the second embodiment.

FIG. 18 is a flowchart showing a process of the system controller 14 in the image stabilization of the image pickup apparatus.

When the process is started, a process of step S31 is performed similarly to the process of step S11 shown in FIG. 11.

If it is judged at step S31 that the camera is in the walking state, processes of steps S32 to S33 are performed similarly to the processes of steps S12 to S13 shown in FIG. 11.

Further, if it is judged at step S31 that the camera is in the non-walking state, amounts of remaining blur in the yaw direction and the pitch direction calculated by the yaw correction amount calculating portion 152*a* and the pitch correction amount calculating portion 152*b* in the image stabilization microcomputer 15 are acquired via the communicating portion 155 (step S34).

Then, by performing cutting-out of an image from image data based on the amounts of remaining blur acquired at S34, the image processing portion 147 corrects an amount of remaining blur in the translation direction (step S35).

When the process of step S33 or step S35 has been performed in this way, the image stabilization process by the system controller 14 ends.

According to the second embodiment as described above, an effect almost similar to that of the first embodiment described above is obtained, and it is possible to suppress unnatural image blur caused when optical correction is switched to electronic correction, because the limit correction relieving portion configured to suppress the translation-direction optical correction function when the correction limit of the image pickup device drive actuator 13 is approached and the subtracting portion 1525 which is a remaining blur amount calculating portion configured to subtract, from an amount of image blur in the translation direction, the amount of image blur in the translation direction corrected by the image pickup device drive actuator 13 to calculate an amount of remaining blur are provided, so that the amount of remaining blur in the translation direction is corrected by the system controller 14 if the camera is in the non-walking state.

Since the pattern matching in the first embodiment described above becomes unnecessary, it is possible to reduce a load on calculation processes and simplify the configuration. Furthermore, it is possible to favorably make a correction even for an object which is difficult to detect by pattern matching (for example, back light, low contrast, a repeat pattern, a moving body and the like).

Further, since the limit correction relieving portion includes the contact compensation coefficient multiplying portion 1524 configured to multiply an amount of image blur in the translation direction detected by the angular velocity sensor 16 and the image stabilization microcomputer 15 by a contact compensation coefficient for suppressing the translation-direction optical correction function before such a correction limit that the movable portion 135 comes into contact with the fixed portion 134 is reached, it is possible to suppress the translation-direction optical correction function when the correction limit is approached, by a simple process of multiplication by a coefficient.

Note that each portion described above may be configured as a circuit. Any circuit may be implemented as a single circuit or as a combination of a plurality of circuits if the circuit can perform a same function. Furthermore, no circuit is limited to such that is configured as a dedicated circuit for performing an intended function, but any circuit may have a configuration in which an intended function is performed by causing a general-purpose circuit to execute a processing program.

Further, though description has been made mainly on an image pickup apparatus, a control method for controlling the image pickup apparatus as described above, or an image stabilization method for performing image stabilization similar to that of the image pickup apparatus is also possible. A processing program for causing a computer to perform a process similar to that of the image pickup apparatus, a computer-readable, non-temporary recording medium which stores the processing program, and the like are also possible.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
a photographing optical system configured to form an optical object image;
an image pickup device configured to photoelectrically convert the object image to generate an image pickup signal;
an image blur detection sensor that detects amounts of image blur of the object image in a translation direction and a rotation direction on an image plane of the image pickup device;

an optical correction actuator configured to cause the image pickup device to move in a plane vertical to an optical axis of the photographing optical system to perform optical correction of image blur in the translation direction and, when necessary, further perform optical correction of image blur in the rotation direction;

an electronic correction circuit that cuts out a part of image data obtained based on the image pickup signal and cause the part to be an output image; and a walking detecting circuit that detects which state the image pickup apparatus is in, a walking state or a non-walking state, wherein if the walking detecting circuit detects that the image pickup apparatus is in the walking state, an amount of correction of the image blur in the rotation direction by the optical correction actuator is caused to be smaller, and an amount of correction of the image blur in the rotation direction by the electronic correction circuit is caused to be larger than a case where the walking detecting circuit detects that the image pickup apparatus is in the non-walking state.

2. The image pickup apparatus according to claim 1, wherein if the walking detecting circuit detects that the image pickup apparatus is in the walking state, the image blur in the rotation direction is corrected by the electronic correction circuit, with the amount of correction of the image blur in the rotation direction by the optical correction actuator set to 0; and if the walking detecting circuit detects that the image pickup apparatus is in the non-walking state, the image blur in the rotation direction is corrected by the optical correction actuator, with the amount of correction of the image blur in the rotation direction by the electronic correction circuit set to 0.

3. The image pickup apparatus according to claim 2, further comprising a remaining blur amount calculating circuit that calculates an amount of remaining blur in the translation direction which remains after the optical correction, based on a plurality pieces of image data acquired at different acquisition time points by performing the optical correction, wherein if the walking detecting circuit detects that the image pickup apparatus is in the non-walking state, the amount of remaining blur in the translation direction is corrected by the electronic correction circuit.

4. The image pickup apparatus according to claim 3, wherein the remaining blur amount calculating circuit comprises a pattern matching circuit that performs pattern matching of the plurality of pieces of image data; and the amount of remaining blur in the translation direction is calculated based on a result of the pattern matching.

5. The image pickup apparatus according to claim 2, further comprising:

a limit correction relieving circuit that suppresses a translation-direction optical correction function when a correction limit of the optical correction actuator is approached; and a remaining blur amount calculating circuit that calculates an amount of remaining blur by subtracting the amount of image blur in the translation direction corrected by the optical correction actuator from the amount of image blur in the translation direction, wherein if the walking detecting circuit detects that the image pickup apparatus is in the non-walking state, the amount of remaining blur in the translation direction is corrected by the electronic correction circuit.

6. The image pickup apparatus according to claim 5, wherein the optical correction actuator comprises a fixed portion fixed to the image pickup apparatus and a movable portion integrally holding the image pickup device and capable of moving in the plane vertical to the optical axis of the photographing optical system relative to the fixed portion; and the limit correction relieving circuit comprises a contact compensation coefficient multiplying circuit that multiplies the amount of image blur in the translation direction detected by the image blur detection sensor by a contact compensation coefficient for suppressing the translation-direction optical correction function before the correction limit at which the movable portion comes into contact with the fixed portion is reached.

7. The image pickup apparatus according to claim 1, wherein the walking detecting circuit detects which state the image pickup apparatus is in, the walking state or the non-walking state, based on a degree of the image blur in the rotation direction detected by the image blur detection sensor.

8. An image stabilization method comprising the steps of:

photoelectrically converting an optical object image by an image pickup device to generate an image pickup signal;

detecting amounts of image blur of the object image in a translation direction and a rotation direction on an image plane of the image pickup device;

causing the image pickup device to move in a plane vertical to an optical axis of a photographing optical system to perform optical correction of image blur in the translation direction and, when necessary, further perform optical correction of image blur in the rotation direction;

performing electronic correction to cut out a part of image data obtained based on the image pickup signal and cause the part to be an output image; and detecting which state the image pickup apparatus is in, a walking state or a non-walking state, wherein if it is detected by the detection that the image pickup apparatus is in the walking state, an amount of correction of the image blur in the rotation direction by performing the optical correction is caused to be smaller, and an amount of correction of the image blur in the rotation direction by performing the electronic correction is caused to be larger than a case where it is detected by the detection that the image pickup apparatus is in the non-walking state.

* * * * *